(12) United States Patent
Sugita et al.

(10) Patent No.: US 12,110,931 B2
(45) Date of Patent: Oct. 8, 2024

(54) PISTON HOUSING BODY

(71) Applicant: NIPPON LIGHT METAL COMPANY, LTD., Tokyo (JP)

(72) Inventors: Kaoru Sugita, Shizuoka (JP); Shimpei Kubota, Nagano (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 18/292,330

(22) PCT Filed: Jul. 28, 2021

(86) PCT No.: PCT/JP2021/027955
§ 371 (c)(1),
(2) Date: Jan. 25, 2024

(87) PCT Pub. No.: WO2023/007627
PCT Pub. Date: Feb. 2, 2023

(65) Prior Publication Data
US 2024/0263677 A1    Aug. 8, 2024

(51) Int. Cl.
*F16D 65/00* (2006.01)
*F16D 55/228* (2006.01)

(52) U.S. Cl.
CPC ....... *F16D 55/228* (2013.01); *F16D 65/0087* (2013.01); *F16D 65/0068* (2013.01)

(58) Field of Classification Search
CPC . F16D 55/228; F16D 65/0068; F16D 65/0087
(Continued)

(56) References Cited

U.S. PATENT DOCUMENTS

| 5,538,105 A | * | 7/1996 | Rike | ...................... F16D 55/228 |
| | | | | 188/73.31 |
| 8,261,889 B2 | * | 9/2012 | Itsuaki | .................. F16D 55/228 |
| | | | | 188/72.4 |

(Continued)

FOREIGN PATENT DOCUMENTS

| JP | H09177843 | 7/1997 |
| JP | H11342460 | 12/1999 |

(Continued)

OTHER PUBLICATIONS

"International Search Report (Form PCT/ISA/210) of PCT/JP2021/027955", mailed on Aug. 31, 2021, with English translation thereof, pp. 1-5.

(Continued)

*Primary Examiner* — Christopher P Schwartz
(74) *Attorney, Agent, or Firm* — JCIPRNET

(57) ABSTRACT

The present invention provides a piston housing body capable of achieving downsizing and weight reduction.
In a piston housing body having a main body portion provided with at least a pair of piston housing portions for housing at least a pair of opposing pistons, an operating fluid circulation flow path connecting the piston housing portions, and a connection portion for connecting an operating fluid supply flow path to the operating fluid circulation flow path, the operating fluid circulation flow path is constituted by a pipe, both end portions of the pipe are cast in the main body portion, and an intermediate portion of the pipe and the connection portion are exposed outside the main body portion.

2 Claims, 4 Drawing Sheets

(58) Field of Classification Search
USPC .................. 188/72.1, 72.4, 73.32, 352, 370
See application file for complete search history.

(56) References Cited

U.S. PATENT DOCUMENTS

| | | | |
|---|---|---|---|
| 9,365,193 B2* | 6/2016 | Freund | F16D 65/092 |
| 10,316,912 B2* | 6/2019 | Crippa | F16D 65/0006 |
| 11,603,161 B2* | 3/2023 | Chen | F16D 65/0018 |
| 2012/0103734 A1 | 5/2012 | Suzuki et al. | |
| 2013/0068573 A1 | 3/2013 | Freund et al. | |

FOREIGN PATENT DOCUMENTS

| | | | | |
|---|---|---|---|---|
| JP | 2010159820 | | 7/2010 | |
| JP | 2012107746 | | 6/2012 | |
| JP | 2013531195 | | 8/2013 | |
| JP | 2019072737 | | 5/2019 | |
| TW | 201604437 A | * | 2/2016 | ............ F16D 65/18 |

OTHER PUBLICATIONS

"Written Opinion of the International Searching Authority (Form PCT/ISA/237) of PCT/ JP2021/027955", mailed on Aug. 31, 2021, with English translation thereof, pp. 1-7.

\* cited by examiner

PISTON HOUSING BODY

CROSS-REFERENCE TO RELATED APPLICATION

This application is a 371 application of the International PCT application serial no. PCT/JP2021/027955, filed on Jul. 28, 2021. The entirety of each of the above-mentioned patent applications is hereby incorporated by reference herein and made a part of this specification.

TECHNICAL FIELD

The present invention relates to a piston housing body made of an aluminum alloy.

BACKGROUND ART

As a piston housing body, there is known a brake caliper in which an aluminum alloy pipe serving as a flow path for brake fluid is embedded in a caliper body to form the piston housing body (for example, see Patent Literature 1). In the piston housing body formed by the casting method of Patent Literature 1, the entire pipe is cast in the caliper body.

CITATION LIST

Patent Literature

Patent Literature 1: JP 1999-342460 A

SUMMARY OF INVENTION

Technical Problem

In the piston housing body of Patent Literature 1, downsizing and weight reduction are required in order to improve the driving performance of the vehicle. The piston housing body casts the entire aluminum pipe in the piston housing body, and in order to prevent defects such as positional accuracy, melt loss, weld lines, and gas generation of the aluminum pipe, it is necessary to ensure a thickness of 3.5 times or more of the outer diameter of the aluminum pipe, especially in the brake disc groove portion.

Therefore, although the piston housing body is lightweight as it is entirely formed of an aluminum alloy, there is room for improvement in terms of thickness, and further downsizing and weight reduction are required.

Therefore, an object of the present invention is to provide a piston housing body capable of achieving downsizing and weight reduction.

Solution to Problem

The present invention for solving the above problems is a piston housing body including a main body portion having at least a pair of piston housing portions for housing a pair of opposing pistons, an operating fluid circulation flow path for connecting the piston housing portions, and a connection portion for connecting an operating fluid supply flow path to the operating fluid circulation flow path, wherein the operating fluid circulation flow path is constituted by a pipe, both end portions of the pipe are cast in the main body portion, and an intermediate portion of the pipe and the connection portion are exposed outside the main body portion.

According to the piston housing body having the above configuration, downsizing and weight reduction of the entire piston housing body can be achieved compared to the case where the entire pipe is embedded in the main body portion.

In the piston housing body of the present invention, it is preferable that a part of a cross section of the intermediate portion of the pipe is embedded in the main body portion, and a portion where flux of the pipe is melted and wetted is in close contact with the piston housing body, and the remaining part of the cross section of the intermediate portion of the pipe is exposed outside the main body portion. According to such a configuration, while achieving downsizing and weight reduction of the main body portion, since a part of the pipe is held and sealed by the main body portion, the pipe can be reinforced. Further, the pipe can function as a circulation flow path for operating fluid acting under pressure.

Further, in the piston housing body of the present invention, an annular flange, an annular groove, or an annular roughened portion is formed on the pipe, flux is applied at least to the flange, the groove, or the roughened portion, and the flange, the groove, or the roughened portion is cast in the main body portion. According to such a configuration, the joining strength and adhesion between the pipe and the caliper body can be increased.

Advantageous Effects of Invention

According to the piston housing body of the present invention, downsizing and weight reduction can be achieved as compared with a conventional piston housing body.

DESCRIPTION OF EMBODIMENTS

First Embodiment

Figure 1:
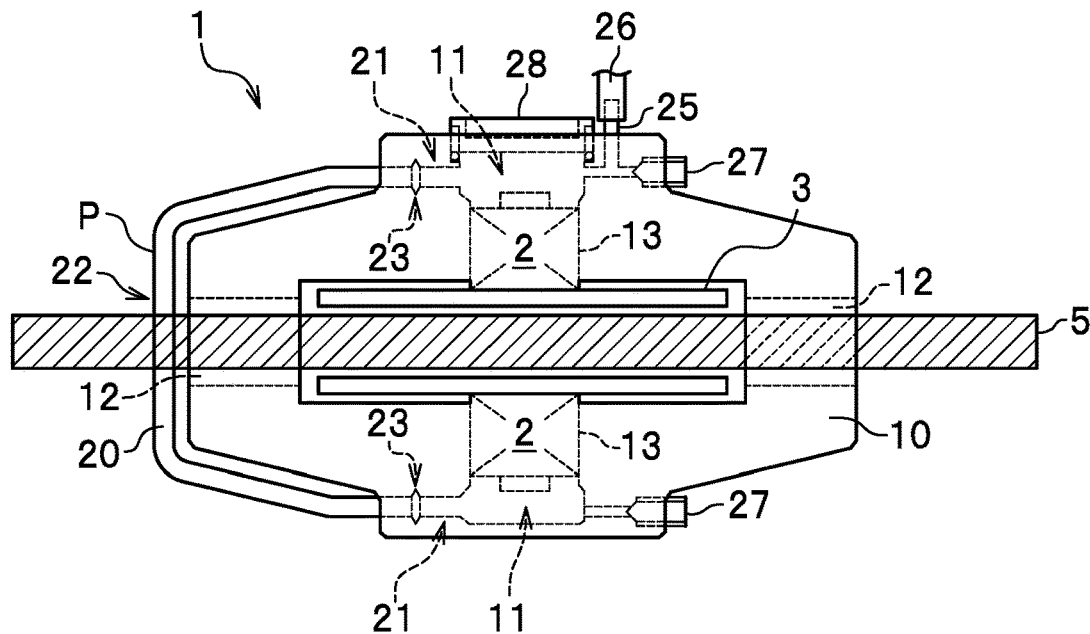
FIG. 1 is a top view showing a piston housing body according to a first embodiment.

The piston housing body according to the first embodiment of the present invention will be described in detail with reference to FIGS. 1, 2, and 3A-3D. The piston housing body of the present embodiment will be described by taking a brake caliper as an example. Such a brake caliper is of an opposed piston type. As shown in FIG. 1, the piston housing body 1 includes a main body portion (caliper body) 10, an operating fluid circulation flow path 20, and a connection portion 25. The main body portion 10 includes at least a pair of piston housing portions 11 for housing at least a pair of pistons 2.

The pistons 2 have a cylindrical shape and are slidably housed in the piston housing portions 11 provided in the main body portion 10. The pistons 2 project and retreat relative to the brake disc 5. At least one pair (one pair in the present embodiment) of pistons 2 are provided so as to face each other across the brake disc 5. Brake pads 3 are attached to the pistons 2, and by the pistons 2 projecting from the piston housing portions 11, the brake pads 3 are pressed against the side surfaces of the brake disc 5.

The main body portion 10 is cast using a 4000 series aluminum alloy. A groove portion 12 covering the peripheral edge of the brake disc 5 is formed inside the main body portion 10. That is, the cross section of the main body portion 10 has a gate-like shape. Piston housing portions 11, 11 are provided on both side walls of the groove portion 12. The pair of piston housing portions 11, 11 face each other. Operating fluid (brake fluid) is filled between the cylinder portion 13 and the piston 2, where the peripheral wall of the piston housing portions 11 serves as the cylinder portion 13, and the piston 2 projects and retreats according to changes in the amount of operating fluid. The piston housing portions 11 are formed according to the number of pistons 2. When there are multiple pairs of pistons 2, multiple pairs of piston housing portions 11 are formed. Note that the operating fluid is not limited to brake fluid, and may be a gas or other liquid.

The operating fluid circulation flow path 20 is a flow path for communicating the pair of piston housing portions 11, 11 with each other and synchronizing the amount of operating fluid in each of the piston housing portions 11. The operating fluid circulation flow path 20 is constituted by a pipe P made of an aluminum alloy. The pipe P is made of an aluminum alloy having a melting point of 630° C. or higher. Both end portions 21, 21 of the pipe are cast in the main body portion 10 and communicate with 25 the respective piston housing portions 11. Annular flanges 23 are formed on both end portions 21, 21 of the pipe P. The flanges 23 are provided to increase the joining property between the pipe P and the main body portion 10, and both end portions 21, 21 of the pipe P are cast together with the flanges 23. An intermediate portion 22 of the pipe P is separated from the main body portion 10 by a predetermined distance and exposed outside the main body portion 10. The intermediate portion 22 is formed along the outer peripheral surface of the main body portion 10 so as to be substantially parallel to the outer peripheral surface.

The connection portion 25 is a connection joint for connecting the operating fluid supply flow path 26 to the piston housing portion 11. The tip end portion of the operating fluid supply flow path 26 is connected to the connection portion 25. Gas vent portions 27 for releasing the pressure in the operating fluid supply flow path 26 to the outside are provided in the pair of piston housing portions 11, 11, respectively. In FIG. 1, 28 denotes a lid that closes an opening formed by a mold core 38 (see FIG. 2).

Figure 2:
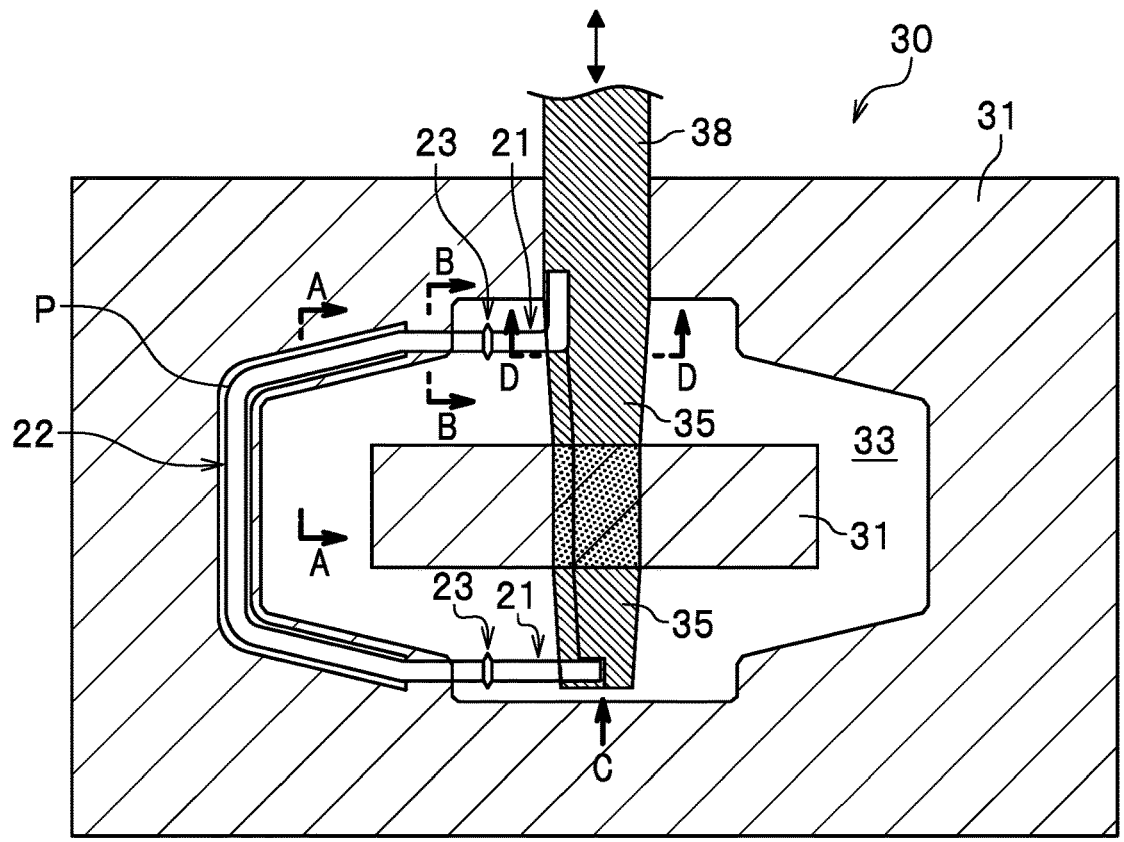
FIG. 2 is a top view showing a state where an operating fluid circulation flow path and a connection portion of the piston housing body according to the first embodiment are set in a mold.
Figure 3A:
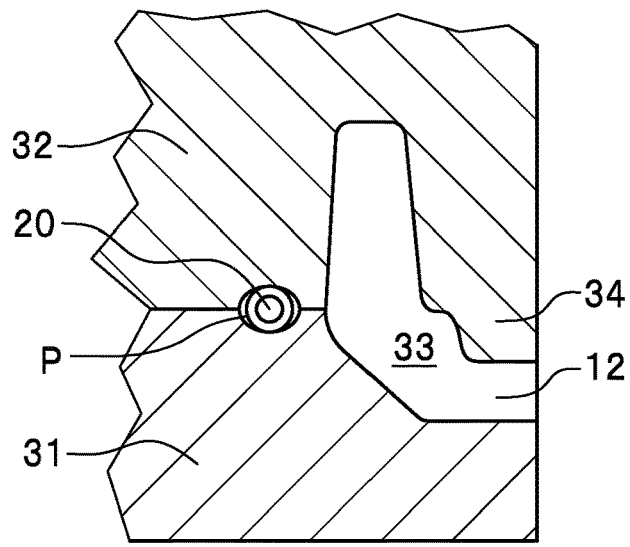
FIG. 3A is a cross-sectional view taken along line A-A in FIG. 2.
Figure 3B:
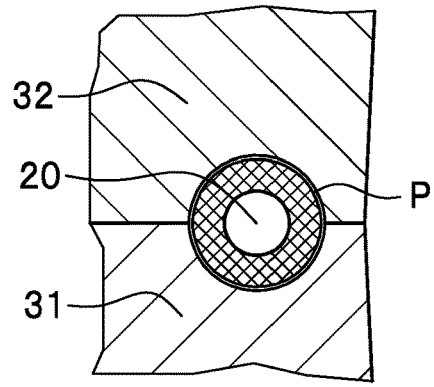
FIG. 3B is a cross-sectional view taken along line B-B in FIG. 2.
Figure 3C:
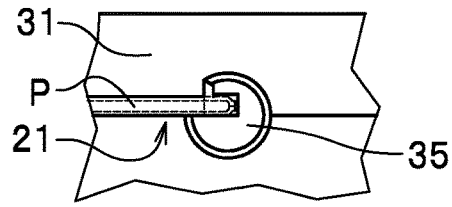
FIG. 3C is an arrow view taken along line C in FIG. 2 showing a protruding portion at the tip end of a mold core.
Figure 3D:
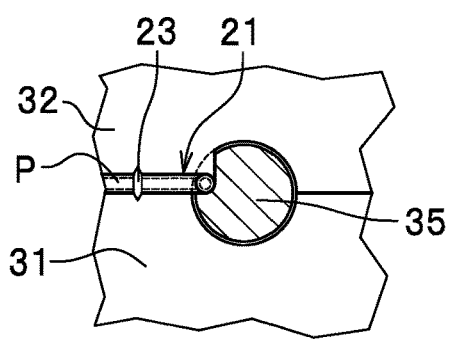
FIG. 3D is an arrow view taken along line D in FIG. 2 showing a protruding portion at the base of the mold core.

When casting the piston housing body 1 having the above configuration, the pipe P constituting the operating fluid circulation flow path 20 is installed in a mold 30 shown in FIGS. 2 and 3A-3D. The mold 30 includes a lower mold 31, an upper mold 32, and a slidable mold core 38. A gate-shaped cavity 33 into which molten metal is poured is formed between the lower mold 31 and the upper mold 32. Note that FIG. 2 shows a top view of the operating fluid circulation flow path 20 and the connection portion 25 of the piston housing body 1 set in the lower mold 31 of the mold 30, but hatching is given to the upper surface of the lower mold 31 (mating surface with the upper mold 32) in order to clarify the position of the cavity 33. The upper mold 32 includes a protruding portion 34 (see FIG. 3A) protruding downward, and this protruding portion 34 forms the groove portion 12. Cylindrical portions 35 of the slidable mold core 38 are disposed on both side surfaces (upper and lower sides in FIG. 2) of the central portion of the lower mold 31, and these cylindrical portions 35 form the piston housing portions 11. A recess for housing the tip end portion of the pipe P is formed at the tip end portion of the cylindrical portion 35, and the tip end portion of the pipe P is fixed (see FIG. 3C). The tip end of the pipe P is closed so that the aluminum alloy molten metal as the casting material does not penetrate. The pipe P having an open base end (opposite to the tip end) is placed at the base end portion of the mold core 38. When the upper mold is closed, the pipe P is sandwiched and fixed between the upper mold 32 and the mold core 38, determining the position of the pipe P to be cast (see FIG. 3D). The both end portions of the pipe P located at these piston housing portions 11 (the tip end portion and the base end portion) are finally removed by machining.

The intermediate portion 22 of the pipe P is housed between the lower mold 31 and the upper mold 32. As shown in section A-A of FIG. 3A and section B-B of FIG. 3B, the recesses of the lower mold 31 and the upper mold 32 forming the space for housing the pipe P both have a curved cross-sectional shape. The cross section of portion B-B is a semicircle having almost the same shape as the pipe shape in order to improve the positional accuracy of the pipe, while the semicircle of the lower mold 31 at cross section A-A is an ellipse larger than a semicircle to facilitate installation of the pipe on the lower mold 31.

The portions where the flanges 23 are formed on both end portions 21, 21 of the pipe P are located in the cavity 33. Flux is applied to the flanges 23 before the casting process. For example, the flux is applied to the front and back surfaces of the half of tip end side of the protruding dimension of the flange 23. Depending on its composition, the flux is applied to the surface of the flange 23 at a rate of 0.560 g/m2. For example, a slurry obtained by dissolving flux powder in a solvent such as water, alcohol, isopropyl or the like can be used as the flux. The slurry flux is applied to the surface of the flange 23 by spraying or with a brush. It is also possible to apply the flux in powder form by electrostatic coating. A fluoride flux is used as the flux. Specifically, the flux mainly contains an aluminum fluoride-potassium based flux. The flux contains a eutectic composition of 45.8 wt % KF-54.2 wt % AlF3 or a composition range close to this that is substantially complexed, complex mixtures $KAlF_4$, $K_2AlF_5 \cdot _5H_2O$, $K_3AlF_6$, LiF, $Cs_3AlF_6$, $CsAlF_4 \cdot _2H_2O$, $Cs_2AlF_5 \cdot H_2O$, and the like. In particular, in the present embodiment, it is preferable that the flux is $KAlF_4 + K_2AlF_5 \cdot _5H_2O$. The melting point of the flux is in the range of 560° C. to 590° C.

In the casting process, molten metal (casting material) is poured into the cavity 33 of the mold 30 to cast both end portions 21, 21 of the pipe P (the portions where the pipe P is cast) together with the flanges 23 in the molten metal. When the molten metal is poured into the cavity 33, the flux is melted by the heat of the molten metal, dissolving the oxide film on the surface of the flange 23. As a result, the flange 23 has a highly active surface state, improving the wettability to the molten metal. Therefore, since the flange 23 is cast without gaps from the molten metal, the adhesion and bonding between the flange 23 and the casting material can be improved. The bonding between the pipe P and the casting material is also improved by forming the flange 23 having a small heat capacity on the pipe P. That is, when the molten metal for pouring is heated, the temperature of the flange 23 becomes higher than that of the pipe portion, the flux is melted, and even if the temperature of the molten metal is low, it is easily fused to the casting material. By the above, sufficient bonding strength and sealing can be ensured between the pipe P and the main body portion 10.

According to the piston housing body 1 of the present embodiment, the main body portion 10 can be formed inside away from the operating fluid circulation flow path 20. That is, instead of casting the entire operating fluid circulation flow path conventionally with the main body portion, defects such as weld lines, gas defects, positional accuracy, and the like can be avoided by exposing the operating fluid circulation flow path 20, the main body portion 10 can be shaped smaller than a conventional main body portion, and the groove portion 12 can be thinned. Thereby, downsizing and weight reduction of the entire piston housing body 1 can be achieved.

Further, in the piston housing body 1, since the annular flanges 23 are formed at both end portions of the pipe P, the bonding strength between the pipe P and the main body portion 10 can be increased. Furthermore, if flux is applied to the flange 23 before the casting process, the bonding strength and sealing can be further increased.

Second Embodiment

Figure 4:
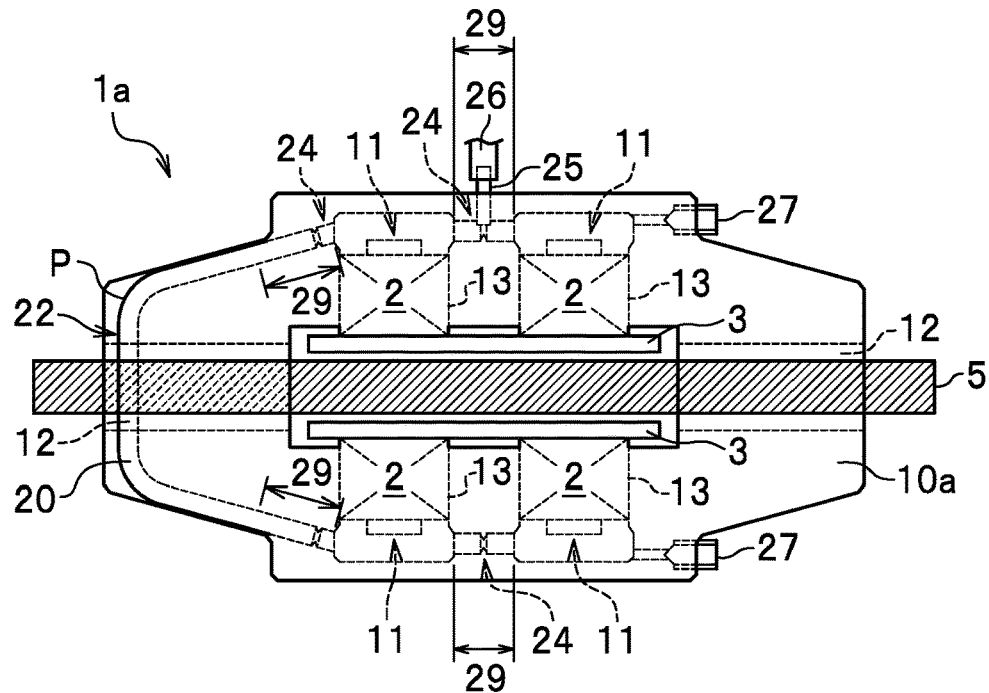
FIG. 4 is a top view showing a piston housing body according to a second embodiment.

Next, the piston housing body 1a according to the second embodiment of the present invention will be described in detail with reference to FIGS. 4, 5, and 6A-6B. As shown in FIG. 4, the piston housing body 1a includes a main body portion 10a, an operating fluid circulation flow path 20, and a connection portion 25. The main body portion 10a includes at least a pair of piston housing portions 11 for housing at least a pair of pistons 2. Since the pistons 2, the operating fluid circulation flow path 20, and the connection portion 25 of the present embodiment have the same configuration as those of the first embodiment, the same reference numerals are given and description thereof is omitted.

In the present embodiment, a part of the intermediate portion 22 of the pipe P is embedded in the main body portion 10a, and the remaining part of the intermediate portion 22 of the pipe P is exposed outside the main body portion 10a. Specifically, the side surface portion on the main body portion 10a side of the circular cross section of the intermediate portion 22 of the pipe P is embedded in the main body portion 10a. That is, a part of the cross section of the intermediate portion 22 is cast in the main body portion 10a so that the portion where the flux of the pipe P is melted and wetted is in close contact with the main body portion 10a. As shown in cross-sectional view taken along line E-E of FIG. 5, FIG. 6A, the intermediate portion 22 of the pipe P is installed on a stepped step portion of the lower mold 31a in a state where it is set in the mold 30a. As shown in cross-sectional view taken along line F-F of FIG. 5, FIG. 6B, about half of the pipe P is sandwiched between a ridge 31b formed in the lower mold 31a and a ridge 32b formed in the upper mold 32a to fix the position of the pipe P. According to these cross sections, a part of the pipe P in contact with the mold is exposed from the main body portion 10a after casting.

Figure 5:
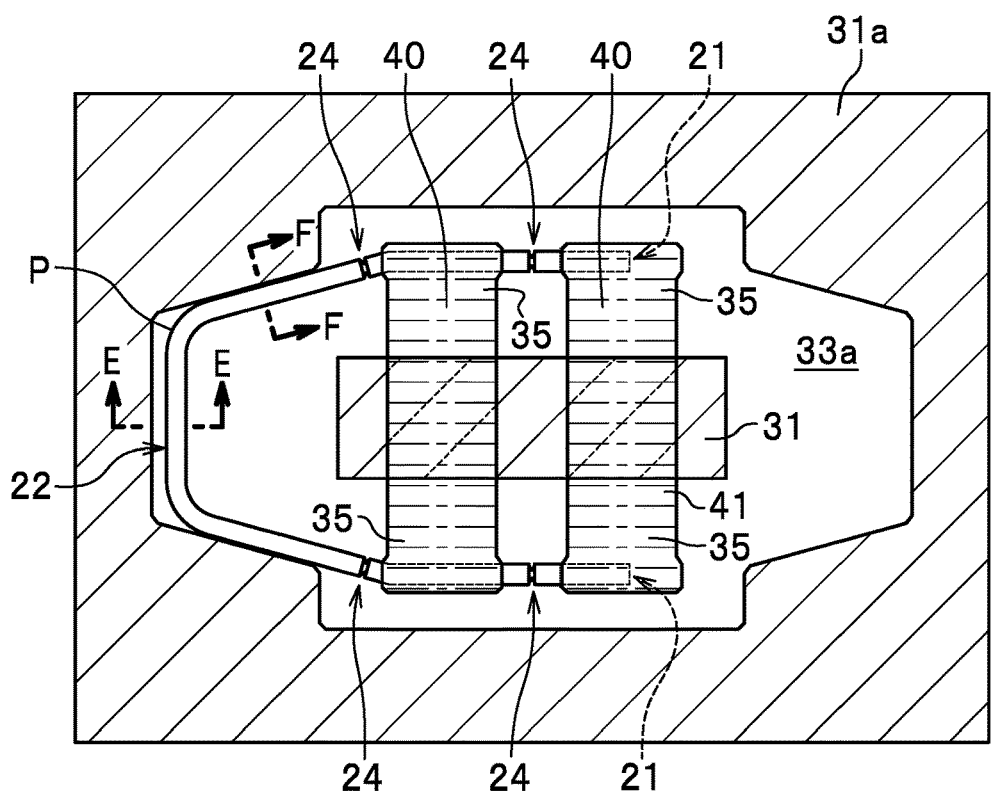
FIG. 5 is a top view showing a state where an operating fluid circulation flow path and a connection portion of the piston housing body according to the second embodiment are set in a mold.

As shown in FIG. 5, both tip end portions 21 of the pipe P of the present embodiment are housed in a collapsible core 40 having an overhanging portion 35. The overhanging portion 35 is for forming the piston housing portion 11 and is disposed two by two on one side surface. The pipe P passes through the core 40 on the left side in FIG. 5 with the tip end of the pipe P remaining inside the core 40 on the right side. The tip end portions 21 of the pipe P have open end faces, and gas can flow in and out through the space after the collapsible core 40 collapses. An annular groove portion 24 is formed in the embedded portion 29 of the pipe P (the portion embedded in the main body portion 10a). The groove portion 24 is provided to increase the joining property between the pipe P and the main body portion 10a instead of the flange in the first embodiment. The groove portion 24 is provided annularly along the outer peripheral surface of the pipe P. Flux is applied to the groove portion 24 and its surrounding portion. Both end portions 21, 21 and the embedded portion 29 of the pipe P are cast together with the groove portion 24. Since the pipe P includes the groove portion 24 instead of the flange, it does not protrude outward. Therefore, the embedded portion 29 of the pipe P can pass through the through hole of the collapsible core 40. The other portions of the pipe P have the same shape as the pipe P of the first embodiment. The brake disc groove portion 12, the piston housing portions 11, 11, the pistons 2, and the brake pads 5 inside the main body portion 10a also have the same configuration as those of the first embodiment.

Figure 6A:
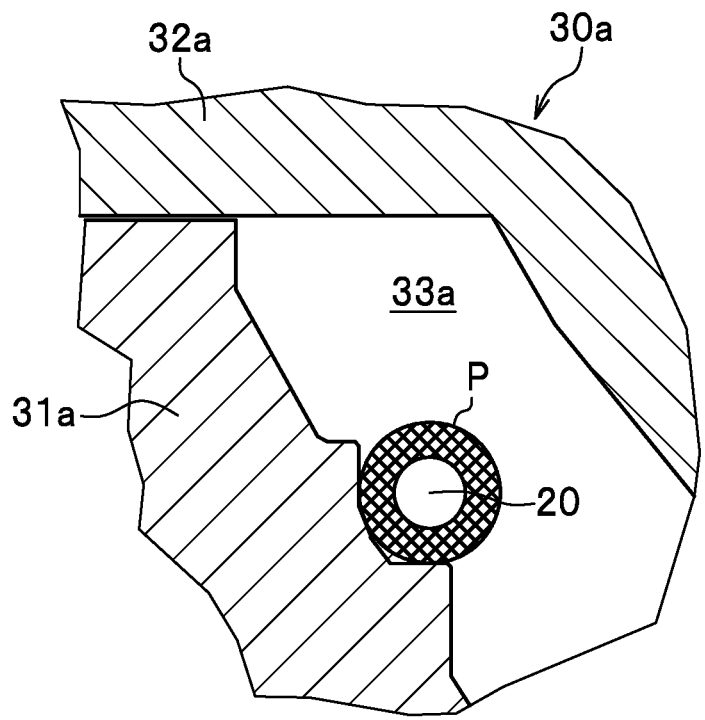
FIG. 6A is a cross-sectional view taken along line E-E in FIG. 5.
Figure 6B:
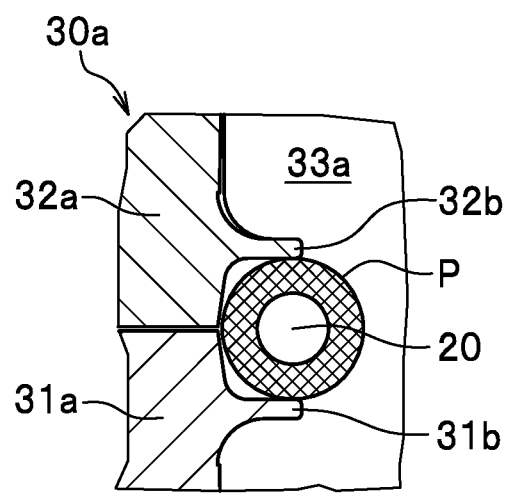
FIG. 6B is a cross-sectional view taken along line F-F in FIG. 5.

When casting the piston housing body 1a having the above configuration, the pipe P constituting the operating fluid circulation flow path 20 is installed in a mold 30a shown in FIGS. 5 and 6A-6B. The mold 30a includes a lower mold 31a, an upper mold 32a, and a collapsible core 40 that collapses after casting. A gate-shaped cavity 33a into which molten metal is poured is formed between the lower mold 31a and the upper mold 32a. Note that FIG. 5 shows a top view of the operating fluid circulation flow path 20 and the connection portion 25 of the piston housing body 1a set in the lower mold 31a of the mold 30a, but hatching is given to the upper surface of the lower mold 31a (mating surface with the upper mold 32a) in order to clarify the position of the cavity 33a.

As shown in cross-sectional view E-E of FIG. 6A, the intermediate portion 22 of the pipe P is mounted on a stepped portion of the lower mold 31a. Fixing of the intermediate portion 22 of the pipe P is achieved by being sandwiched between a ridge 31b of the lower mold 31a and a ridge 32b of the upper mold 32a as shown in cross-sectional view F-F of FIG. 6B. The pipe P is also fixed to the piston housing body 1a at the portion shown in this cross-sectional view F-F. An embedded portion 29 of the pipe P exists between section F-F and the core 40. In the embedded portion 29, the groove portion 24 coated with flux is joined with the molten metal for casting, and the embedded portion 29 is cast together with the groove portion 24 and fixed to the piston housing body 1a in a sealed state. Similarly, the pipe P between the core 40 and the core 40 also serves as the embedded portion 29, the groove portion 24 coated with flux is joined with the molten metal for casting and fixed.

In the casting process, molten metal (casting material) is poured into the cavity 33a of the mold 30 to cast the embedded portion 29 of the pipe P and the intermediate portion 22 of the pipe P that is in contact with the mold 30a together with the molten metal. Thereby, the piston housing body 1a is formed in which a part of the intermediate portion 22 of the pipe P is integrated with the main body portion 10a.

According to the piston housing body 1a of the present embodiment, the following operational effects can be obtained. That is, whereas conventionally the entire operating fluid circulation flow path has been cast in the main body portion, in the piston housing body 1a, by providing the groove portion 24 coated with flux in the embedded portion 29 and fixing and sealing the pipe P to the main body portion 10a, while ensuring the necessary fixing strength, a part of the pipe P (the intermediate portion 22) can be exposed outside. Thereby, defects such as weld lines, gas defects, poor positional accuracy of pipes, etc. caused by casting the whole can be eliminated, so that the shape can be made smaller than a conventional main body portion.

Furthermore, in the present embodiment, since a part of the intermediate portion 22 of the operating fluid circulation flow path 20 is cast in and held by the main body portion 10a so as not to protrude from the surface of the main body portion 10a, the gap between the brake caliper and the wheel can be reduced, and there is an advantage that the operating fluid circulation flow path 20 (pipe P) is protected and damage due to stones thrown up during traveling can be prevented. In short, in the present embodiment, downsizing and weight reduction of the main body portion 10a and reinforcement of the pipe P are achieved at the same time.

The embodiments of the present invention have been described above, but design changes can be made as appropriate without departing from the spirit of the present invention. For example, in the first embodiment, the intermediate portion 22 of the pipe P is separated from the outer peripheral surface of the main body portion 10 by a predetermined distance, while in the second embodiment, a part of the intermediate portion 22 of the pipe P is cast in the main body portion 10a. However, the invention is not limited to this, and the intermediate portion of the pipe may be brought into contact with the outer peripheral surface of the main body portion along the outer peripheral surface.

Further, in the above embodiment, an annular flange 23 (first embodiment) or an annular groove portion 24 (second embodiment) is formed on the portion where the pipe P is cast, and flux is applied to the flange 23 or the groove portion 24 and its surroundings (the portion where the pipe P is cast). However, the invention is not limited thereto. Instead of the flange 23 and the groove portion 24, a roughened portion may be formed and flux may be applied to the roughened portion to cast the roughened portion.

The invention claimed is:

1. A piston housing body comprising:
a main body portion having at least a pair of piston housing portions for housing a pair of opposing pistons;
an operating fluid circulation flow path for connecting the piston housing portions; and
a connection portion for connecting an operating fluid supply flow path to the operating fluid circulation flow path, wherein
the operating fluid circulation flow path is constituted by a pipe,
both end portions of the pipe are cast in the main body portion, and an intermediate portion of the pipe and the connection portion are exposed outside the main body portion,
a part of a cross section of the intermediate portion of the pipe is embedded in the main body portion, and a portion where flux applied to the pipe is melted and wetted is in close contact with the piston housing body, and
an remaining part of the cross section of the intermediate portion of the pipe is exposed outside the main body portion.

2. The piston housing body according to claim 1, wherein
an annular flange, an annular groove, or an annular roughened portion is formed on the pipe,
flux is applied at least to the flange, the groove, or the roughened portion, and
the flange, the groove, or the roughened portion is cast in the main body portion.

* * * * *